United States Patent
Agostini et al.

(10) Patent No.: US 12,296,902 B2
(45) Date of Patent: May 13, 2025

(54) MOTOR VEHICLE HAVING A STEERING MEANS AND METHOD FOR PROVIDING A FEEDBACK TORQUE FOR THE STEERING MEANS

(71) Applicant: AUDI AG, Ingolstadt (DE)

(72) Inventors: Johannes Agostini, Reichertshofen (DE); Shane Cannon, Beilngries (DE)

(73) Assignee: AUDI AG, Ingolstadt (DE)

( * ) Notice: Subject to any disclaimer, the term of this patent is extended or adjusted under 35 U.S.C. 154(b) by 165 days.

(21) Appl. No.: 18/339,270

(22) Filed: Jun. 22, 2023

(65) Prior Publication Data

US 2024/0025476 A1    Jan. 25, 2024

(30) Foreign Application Priority Data

Jul. 21, 2022   (DE) .......................... 102022118311.4

(51) Int. Cl.
B62D 6/00   (2006.01)

(52) U.S. Cl.
CPC .................... B62D 6/008 (2013.01)

(58) Field of Classification Search
CPC ... B62D 6/008; B60C 2019/004; B60C 19/00; B60W 40/06; B60W 2420/54; B60W 2420/403
USPC ...................................... 701/41–44
See application file for complete search history.

(56) References Cited

U.S. PATENT DOCUMENTS

| | | | |
|---|---|---|---|
| 11,262,737 B2 | 3/2022 | Cella et al. | |
| 11,814,117 B2 * | 11/2023 | Narasimhan | B62D 3/126 |
| 12,005,978 B2 * | 6/2024 | Yeon | B62D 6/008 |
| 12,037,066 B2 * | 7/2024 | Shin | B62D 6/008 |
| 12,110,072 B2 * | 10/2024 | Sakayori | B62D 6/008 |
| 2004/0148078 A1 | 7/2004 | Nakano et al. | |
| 2015/0329142 A1 | 11/2015 | Takeda | |

FOREIGN PATENT DOCUMENTS

| | | |
|---|---|---|
| DE | 102008046269 B3 | 12/2009 |
| DE | 102016207435 A1 | 11/2017 |
| DE | 102016122843 A1 | 5/2018 |
| DE | 102017126672 A1 | 5/2018 |
| DE | 102018117975 A1 | 1/2019 |

(Continued)

OTHER PUBLICATIONS

Extended Search Report issued on Jan. 22, 2024, in corresponding European Application No. 23176710.4, 32 pages.

(Continued)

*Primary Examiner* — Hai H Huynh
(74) *Attorney, Agent, or Firm* — Maier & Maier, PLLC (57) ABSTRACT

A motor vehicle having a steering mechanism rotatably mounted around a steering axis, the steering angle of at least one of the wheels of the motor vehicle is changeable. A feedback actuator, and a control unit, and a feedback torque with respect to the steering axis can be applied to the steering mechanism by the feedback actuator. The control unit is configured to specify the feedback torque as a function of feedback data provided to the control unit. The feedback data are wheel sensor data of at least one wheel sensor of the motor vehicle respectively arranged in or on at least one of the wheels and/or roadway sensor data of at least one roadway sensor of the motor vehicle.

20 Claims, 2 Drawing Sheets

(56) References Cited

FOREIGN PATENT DOCUMENTS

| | | |
|---|---|---|
| DE | 102018204582 A1 | 9/2019 |
| DE | 102019101809 A1 | 7/2020 |
| DE | 112020004023 T5 | 5/2022 |
| JP | 2021115937 A | 8/2021 |

OTHER PUBLICATIONS

Search Report issued on Feb. 20, 2023, in corresponding German Application No. 102022118311.4, 10 pages.

\* cited by examiner

MOTOR VEHICLE HAVING A STEERING MEANS AND METHOD FOR PROVIDING A FEEDBACK TORQUE FOR THE STEERING MEANS

FIELD

The invention relates to a motor vehicle having a steering means rotatably mounted around the steering axis, by the actuation of which by the driver of the motor vehicle the steering angle of at least one of the wheels of the motor vehicle is changeable, a feedback actuator, and a control unit, wherein the steering means can be subjected by the feedback actuator to a feedback torque with respect to the steering axis, wherein the control unit is configured to specify the feedback torque as a function of feedback data provided at the control unit. In addition, the invention relates to a method for providing a feedback torque for the steering means of a motor vehicle mounted around a steering axis.

BACKGROUND

Steer-by-wire systems, in which there is no direct mechanical or hydraulic connection between a steering means, thus in particular a steering wheel, and the steered wheels, are increasingly gaining relevance, since savings in installation space are possible due to their use, on the one hand, and auxiliary functions, for example adjusting the steering feeling to driver wishes or a specific driving mode, additional assistance functions, etc., are made possible with little expenditure, on the other hand.

In many applications, the use of presently typical electromechanical steering systems is alternatively also possible or expedient. There is a mechanical coupling between the steering means and the steered wheels therein, but an additional assisting steering torque can be applied by a steering actuator. In this case as well, auxiliary functions, for example adjusting the steering feeling to driver wishes or a specific driving mode, additional assistance functions, etc., can be made possible with little expenditure, on the other hand.

It is sometimes perceived to be disadvantageous in steer-by-wire systems in relation to hydraulic steering that under certain circumstances a less exact and rapid feedback of the driving state or the interaction of the steered wheels with the roadway to the driver is possible via such a steer-by-wire system than would be the case with hydraulic steering. This is perceived as disadvantageous in particular if sporty driving or driving at the limits is desired or necessary.

In spite of the mechanical coupling between steering means and wheels, this problem can also be relevant in electromechanical steering systems. In these systems, certain deviations are generally possible between the steering angle on the steering means and the steering angle set for the steered wheels, for example due to a torsion bar in the steering torque path. This steering angle difference can be detected by sensors and evaluated, for example, in order to achieve a suitable steering assistance by the steering actuator. This can have the result that force or torque applications at the wheels are not transmitted to an adequate extent to the steering means via the mechanical coupling path, so that it can be expedient, similarly as in steer-by-wire systems, to provide an actuator feedback at the steering means, which, as explained above, is sometimes perceived as less exact and rapid.

In conventional steer-by-wire systems or electromechanical steering systems, primarily data of steering wheel sensors of the vehicle are used as input data for a torque feedback to the driver via the steering means. Due to the inertia of the wheels and the steering mechanism, interactions with the roadway, for example driving over an irregularity, can sometimes only be communicated with a certain delay to the driver and the mentioned factors moreover results in damping of high-frequency force or torque applications or of sharp transients of the forces or torques coupled into the wheels.

Providing haptic feedback on the basis of sensor data is known from document U.S. Pat. No. 11,262,737 B2. For example, sensors which are arranged on components of the steering system can be used.

Document DE 10 2016 122 843 A1 proposes reducing oscillations in a steering system in that oscillations of the component are detected using a sensor, in particular using a microphone, and an electric motor is activated to adjust the component to damp the oscillations.

SUMMARY

The invention is therefore based on the object of further improving the feedback of the driving state or the interaction between wheel and roadway to the driver, in particular upon use of a steer-by-wire system or an electromechanical steering system.

The object is achieved according to the invention by a motor vehicle of the type mentioned at the outset, wherein the feedback data are or comprise wheel sensor data of at least one wheel sensor of the motor vehicle respectively arranged in or on at least one of the wheels and/or roadway sensor data of at least one roadway sensor of the motor vehicle, which is configured for contactless detection of a section of the roadway traveled by the motor vehicle, and/or processing data determined as a function of the wheel sensor data and/or the roadway sensor data.

The invention is based on the concept of detecting force or torque applications to a steered wheel, on the one hand, significantly closer to the roadway than would be possible by monitoring the wheel steering angle, in that the wheel sensor is used, and/or, on the other hand, being able to predict possible force or torque applications in the wheels by the contactless detection of the roadway sensor data via the roadway sensor by way of the described procedure, on the one hand, the delays explained at the outset due to the mechanical inertia of the steering system can be avoided and, on the other hand, high-frequency force or torque applications can also be fed back with good accuracy to the driver.

In this case, it is possible in particular that the wheel sensor data or roadway sensor data are primarily used to specify a high-frequency component of the feedback torque, which communicates, for example, sharp torque transients or high-frequency variable torques due to roadway irregularities to the driver, while low-frequency torque components, for example a centering torque due to a lag or counter torques, which simulate friction of the steering system, are specified on the basis of typical input data, thus in particular on the basis of data of a steering angle sensor.

A respective wheel sensor can be provided in particular in or on the one wheel of the motor vehicle, the steering angle of which is changeable by the steering means. In particular forces or torques on steered wheels can thus be detected with low latency and high accuracy via the respective wheel sensor. Additionally or alternatively, however, it is also possible to use at least one wheel sensor in or on a non-steered wheel, which can be used, for example, to distinguish between different roadway coverings, for example between driving on smooth asphalt and/or gravel.

The roadway sensor can in particular collect items of information about upcoming roadway sections and therefore predict forces or torques expected to act in the future on the wheel. The roadway sensor can be arranged on the motor vehicle and designed in such a way that the section of the roadway traveled by the motor vehicle detected thereby is located at least partially in front of the motor vehicle. In this case, it can be possible, in particular for imaging roadway sensors, that the processing of the roadway sensor data occupies a certain amount of time, for example a few tens of milliseconds, but since roadway irregularities and other roadway features which can result in force or torque applications on the wheel can already be detected significantly before contact of the wheel with the corresponding roadway feature, the torque feedback can take please via the steering means without delay to the estimated contact point in time.

In the simplest case, the wheel sensor data and/or the roadway sensor data are supplied directly to the control unit specifying the feedback torque. However, it can also be advantageous to carry out separate preprocessing of at least parts of these data by a separate processing unit, so that the above-mentioned processing data can be provided to the control unit. This can be advantageous, for example, in order to use standard hardware for image processing or the like.

The explained provision of a feedback torque can in principle also be used in a hydraulic steering system, for example, to further increase the accuracy of the torque feedback to the driver or be able to adapt his preferences. However, the explained procedure is particularly advantageous if no direct mechanical or hydraulic coupling is present between steering means and wheel, thus in particular in the steer-by-wire systems explained at the outset, or if this coupling permits certain steering angle differences or a certain amount of play between steering means and wheel, as is generally the case in electromechanical steering systems.

For example, the motor vehicle can comprise at least one steering actuator, by which a steering angle of at least one wheel of the motor vehicle is changeable or by which an additional steering torque is applicable, and the or a further control unit for activating the steering actuator as a function of a target steering angle, which is dependent on output data of a steering means sensor coupled to the steering means. Steer-by-wire systems and electromechanical steering systems in motor vehicles are known as such and are therefore not to be explained in detail here.

The wheel sensor can be configured to detect a deformation of at least one section of a tire surrounding a rim of the respective wheel and/or a force which acts on a tread of that are used for contact with the roadway. Additionally or alternatively, it can also be expedient to detect a force on at least one side wall of the tire. The detected deformation can in particular be a change of the curvature of the tread or a respective section of the tread or a shear of the tire material, by which irregularities and forces resulting therefrom can be detected quickly and with high accuracy.

Alternatively or additionally, forces on the tire or on its tread or deformations of the tire can be detected indirectly via a pressure sensor, which detects the air pressure in the tire. This can result in a particularly low implementation expenditure, since monitoring of the air pressure in the tire takes place in some vehicles in any case. However, in relation to a direct detection of deformations or forces, for which a particularly advantageous possibility will also be explained hereinafter, monitoring of the air pressure in the tire, due to the damping resulting in this case, can result in blurring of transients or damping of high-frequency components of the forces or torques acting on the tire and thus in less detailed feedback of the driving state to the driver.

The wheel sensor can be a piezoelectric sensor, which is embedded in a radial outer wall, used for contacting the roadway, of the or a tire surrounding the or a rim of the respective wheel or is arranged on its inner surface. The outer surface of the outer wall can in particular form the tread. Forces or deformations essentially perpendicular to the outer wall can compress the piezoelectric sensor, due to which a voltage drops thereon, by which such a force action or deformation can be detected quickly and with high accuracy.

Additionally or alternatively, a piezoelectric sensor can be used which provides corresponding output voltages in the event of a shear of the piezoelectric material, by which, for example, shears of the tire material can also be recognized and detected well.

In that, for example, multiple corresponding sensor elements are used in the axial direction of the wheel or tire, it can be detected quickly and accurately whether forces act on the wheel inside or wheel outside and, by using multiple sensors in the circumferential direction, it is also possible to distinguish between forces on the wheel front side and rear side if the wheel position is known, so that a torque resulting from the corresponding force application on the wheel can be determined with good accuracy.

The motor vehicle can comprise a microphone, which is arranged and configured suitably in particular for detecting a running noise of at least one of the wheels, wherein the feedback data additionally comprise an audio signal detected by the microphone or further processing data determined as a function of the audio signal and/or wherein the processing data are additionally dependent on the audio signal. On the basis of the audio signal or with the aid of the microphone, in particular vibrations of the wheel, which can result due to a rough roadway surface or the like and would be transmitted to the steering wheel in a mechanical or hydraulic steering system, can be recognized well. Since such vibrations are a quasi-continuous disturbance, it is not necessary in this case to be able to separate individual force applications, rather it is sufficient, in order to ensure a suitable driving feeling, for example to couple a noisy auxiliary signal, the frequency composition of which is selected in dependence on the audio signal, as an additional feedback torque into the steering means.

While corresponding vibrations on the steering means can provide additional items of information about a traveled underlying surface, they are sometimes assessed by drivers as reducing comfort, however. In particular with respect to the consideration of the audio signal, but also with respect to the consideration of other input variables or the feedback torques resulting from the respective input variables, it is therefore possible that they are modified, for example filtered or scaled, in dependence on a selected driving mode. For example, in a sport mode, vibrations and torque shocks can be transmitted essentially undamped to the steering means, while smoothing or damping can take place in a comfort mode.

The roadway sensor can, on the one hand, be an imaging sensor, by which imaging data depicting the section of the roadway are provided, and/or, on the other hand, can provide at least one item of depth information with respect to the depicted section of the roadway, wherein the roadway sensor data comprise the image data and/or the depth information or are dependent on the image data and/or the depth information. An item of depth information is particularly preferably provided for each pixel of the image data. This can be achieved, for example, by using a time-of-flight camera.

Alternatively, it would also be possible for the depth information to have lower resolution than the image data, for example, in that separate detection means are used, for example a camera and a radar sensor. Image data and items of depth information are particularly suitable for recognizing and locating roadway irregularities, for example potholes, rocks or other objects lying on the roadway, and the like. Corresponding irregularities can result in a significant torque application to the steered wheels and are therefore to be fed back via the steering means to the driver.

The control unit or a processing unit of the motor vehicle providing the processing data can be configured, by evaluating the image data and/or the depth information, to recognize at least one roadway feature, in particular an irregularity of the roadway, and to determine its position with respect to at least one of the wheels, wherein the time curve of the feedback torque is dependent on the determined position. In particular, it can be predicted whether a wheel or which wheel is expected to contact the roadway feature or which part of the wheel is expected to contact the roadway feature.

Therefore, on the one hand, the point in time of playing out of a feedback torque curve assigned to the roadway feature can be dependent on a predicted contact point in time, which can be determined in dependence on the position and further parameters, for example the vehicle velocity and optionally the steering angle. On the other hand, the specific form of the played-out feedback torque curve can be dependent on which parts of the wheel contact the irregularity, thus, for example, whether the inside or outside or front or rear side of the respective wheel contacts the irregularity.

The roadway sensor can in particular be a camera, in particular a time-of-flight camera and/or an infrared camera, or a laser scanner or a radar sensor or an ultrasonic sensor. The motor vehicle can also comprise several of the mentioned sensor types as the roadway sensor, wherein the sensor data of the various roadway sensors can be provided separately to the control unit or, for example, can be fused by a sensor data fusion, for example, to generate a three-dimensional roadway model of the upcoming roadway or the like.

The motor vehicle can comprise a steering angle sensor for detecting steering angle data relating to the steering angle of at least one of the wheels and/or a suspension sensor for detecting at least one parameter of the suspension, in particular a height level of the suspension, and/or an acceleration sensor for detecting an acceleration of the motor vehicle, wherein the feedback data comprise the steering angle data and/or the parameter of the suspension and/or the acceleration of the motor vehicle and/or further processing data dependent on the steering angle data and/or the parameter of the suspension and/or the acceleration of the motor vehicle and/or wherein the processing data are dependent on the steering angle data and/or the parameter of the suspension and/or the acceleration of the motor vehicle.

The evaluation of steering angle data of a steering sensor for feedback of steering information to the driver is well known per se. As was already explained at the outset, this is also well suitable for torque feedback with respect to slowly changing torques at the wheels and can furthermore be used for this purpose in the motor vehicle according to the invention, for example. The weaknesses of torque feedback on the basis of the steering angle data are essentially completely avoided by the above-explained additional input variables, thus in particular by evaluating the wheel sensor data, the roadway sensor data, and/or the audio signal, so that overall improved torque feedback can take place.

A parameter of the suspension, in particular the height level of the suspension, thus in particular to what extent a wheel is deflected in the direction of the chassis, can be evaluated to detect forces at individual wheels or groups of wheels, for example due to irregularities. The parameter can thus be evaluated alternatively to the wheel sensor data or redundantly thereto. The parameter of the suspension can preferably be analyzed, however, to take into consideration steering torques due to wheel load changes, for example due to load states in the case of rocking or pitching of the vehicle body, in the torque feedback via the steering means. For example, pitching of the motor vehicle due to an acceleration or braking process can additionally load or unload the wheels of the steered axle and thus increase or reduce the steering resistance.

The acceleration of the motor vehicle can also be evaluated, for example, to be able to predict rocking or pitching of the motor vehicle if suitable parameters of the suspension are not known. Additionally or alternatively, the acceleration can be accelerated, for example, to estimate a sideslip angle of the motor vehicle or, for example, in conjunction with known wheel speeds, to estimate the slip on the steered wheels. Corresponding variables in turn result in torques at the wheels, which can be fed back to the driver via the steering means.

The motor vehicle can comprise at least one driver assistance system, in particular an electronic stability control, wherein the feedback data comprise at least one item of assistance information provided by a component of the driver assistance system, which relates in particular to a sideslip angle of the motor vehicle and/or a slip of at least one wheel of the motor vehicle, and/or further processing data dependent on the assistance information, and/or wherein the processing data are dependent on the assistance function. The further processing data can be the same for the processing data as were explained above with respect to the steering angle data, the parameter of the suspension, or the acceleration of the motor vehicle. However, these can also be additional further processing data or no processing data can be used which are dependent on the steering angle data, the parameter of the suspension, or the acceleration.

The component of the driver assistance system can in particular be a control unit or processing unit which implements the driver assistance system or processes data in the context of the driver assistance system, respectively. In this case, for example, a flow angle or a slip can be provided directly as assistance information. However, the component can also be a single sensor or a group of sensors of the driver assistance system. For example, wheel speeds can be evaluated which are provided by wheel speed sensors of a slip controller.

By evaluating an item of assistance information, items of information can be taken into consideration which can have an influence on torques at steered wheels of the motor vehicle and can thus advantageously be taken into consideration in the torque feedback via the steering means. However, since corresponding variables are detected or provided or processed in the context of the driver assistance system in any case, essentially no additional hardware expenditure is necessary for this further improvement of the torque feedback.

The control unit or a respective subunit of the control unit can be configured to determine a first partial torque as a function of the wheel sensor data and/or the roadway sensor data and/or the processing data determined as a function of the wheel sensor data and/or the roadway sensor data and to determine a second partial torque as a function of an item of additional information provided by a further vehicle component, wherein the control unit can be configured to specify the feedback torque as the sum of the first partial torque, which is filtered in particular, and the second partial torque, which is filtered in particular. Two feedback paths for the feedback torque at the steering means can thus be provided, the torque specifications of which are added or are added after filtering of one or both of the partial torques. In particular, these two feedback paths can react at different speeds, thus, for example, can have different latencies and/or different bandwidths for the feedback signals.

As was already explained, for example, steering angle sensors generally only enable a relatively sluggish torque feedback, because of which they can be taken into consideration as additional information. This typically also applies to the parameter of the suspension, the acceleration of the motor vehicle, and the assistance information, since these variables are relatively strongly affected by a damping of force or torque applications at the wheel by the inertia of the chassis of the motor vehicle. Since only a relatively low frequency torque feedback with respect to these variables can therefore take place in any case, it can be advantageous to filter the second partial torque through a low-pass filter, for example to avoid artifacts due to a low sampling rate of certain variables or other interference, which does not actually result from the driving operation.

As was already explained in detail above, the wheel sensor data or the roadway sensor data allow a torque feedback with significantly lower latency, sharper transients, and with higher frequencies of the torque change. It can therefore be expedient to conduct the torque feedback on the basis of these input variables and in particular also the audio signal via a separate, parallel feedback path.

Under certain circumstances, it can be advantageous to carry out high-pass filtering for this fast feedback path, since, for example, piezoelectric sensors arranged in tire casings can have offset voltages depending on the filling pressure of the tire, temperature, etc., which can result in constant or very low frequency erroneous contributions in the first partial torque. This can be avoided by high-pass filtering at low frequencies, for example at less than 5 Hz or less than 1 Hz.

In addition to the motor vehicle according to the invention, the invention relates to a method for providing a feedback torque for a steering means of a motor vehicle rotatably mounted around a steering axis, wherein the steering angle of at least one of the wheels of the motor vehicle is changed by actuation of the steering means by the driver of the motor vehicle, wherein a feedback torque with respect to the steering axis is applied to the steering means by a feedback actuator, wherein the feedback torque is specified as a function of feedback data, wherein the feedback data are or comprise wheel sensor data of at least one respective wheel sensor of the motor vehicle arranged in or at at least one of the wheels and/or roadway sensor data of at least one roadway sensor of the motor vehicle, which is configured for contactless detection of a section of the roadway traveled by the motor vehicle, and/or processing data determined as a function of the wheel sensor data and/or the roadway sensor data.

The method according to the invention can be implemented in particular by the motor vehicle according to the invention or the motor vehicle according to the invention can be used to carry out the method according to the invention. Independently thereof, features explained for the motor vehicle according to the invention can be transferred with the advantages mentioned there to the method according to the invention and vice versa.

At least one control unit or processing unit can be used to implement the determination or processing or control steps of the method, as explained above with respect to the motor vehicle. For this purpose, this can be in particular a programmable data processing unit, for example a microprocessor or FPGA, having corresponding programming.

BRIEF DESCRIPTION OF THE FIGURES

Further advantages and details of the invention result from the following exemplary embodiments and the associated drawings. In the schematic figures.

DETAILED DESCRIPTION

Figure 1:
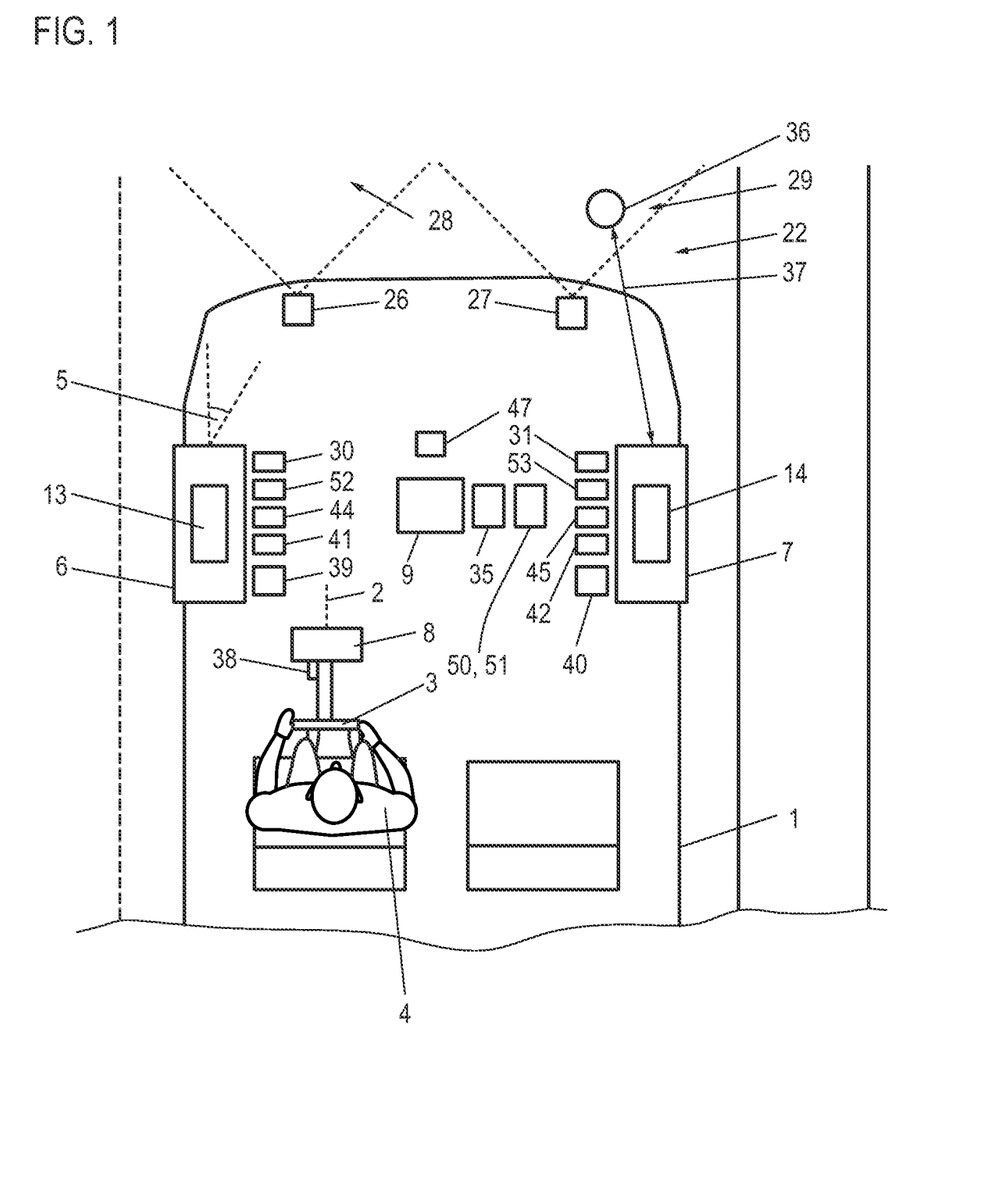
FIG. 1 shows a detail view of an exemplary embodiment of a motor vehicle according to the invention.

FIG. 1 shows a motor vehicle 1 having a steer-by-wire system, in which the steering means 3 is not directly hydraulically coupled to the steered wheels 6, 7, but rather the position or the steering angle 5 of the wheels 6, 7 is instead set, as a function of the target steering angle detected via a steering angle sensor 38, by respective actuators 39, 40 at the wheels 6, 7.

In order to give a driver 4 feedback about steering forces or torques acting on the wheels 6, 7, which occur, for example, due to a lag of the wheels 6, 7 at a nonzero steering angle, a feedback actuator 8 is activated by a control unit 9 as a function of feedback data in order to apply a feedback torque to the steering means 3 with respect to the steering axis 2.

In an alternative embodiment (not shown), instead of a steer-by-wire system, however, an electromechanical steering system could also be used, in which, as already explained in the general part, the use of a feedback actuator having the controller explained hereinafter can also be expedient.

In typical steer-by-wire systems or electromechanical steering systems, primarily steering angle data 43 detected via a respective steering angle sensor 41, 42 are used as feedback data 11, which relate to the current actual steering angle 5 of the respective wheel 6, 7. However, as already discussed in the general part, this can have the result that force or torque applications at the wheels 6, 7 are only fed back with a certain delay to the steering means 3 due to the inertia of the wheels or the steering mechanism, or that high-frequency interference or sharp transients are strongly damped.

Such a delayed or rather sluggish feedback is often perceived as annoying by drivers 4, in particular when sporty driving is desired or when driving at the limits of the motor vehicle 1. Therefore, input variables are alternatively or additionally used in the motor vehicle 1 to specify feedback torques by the feedback actuator 8. This or the method executed in this case will be explained hereinafter with additional reference to FIG. 2, which shows data structures relevant for determining the feedback torque 10.

Figure 2:
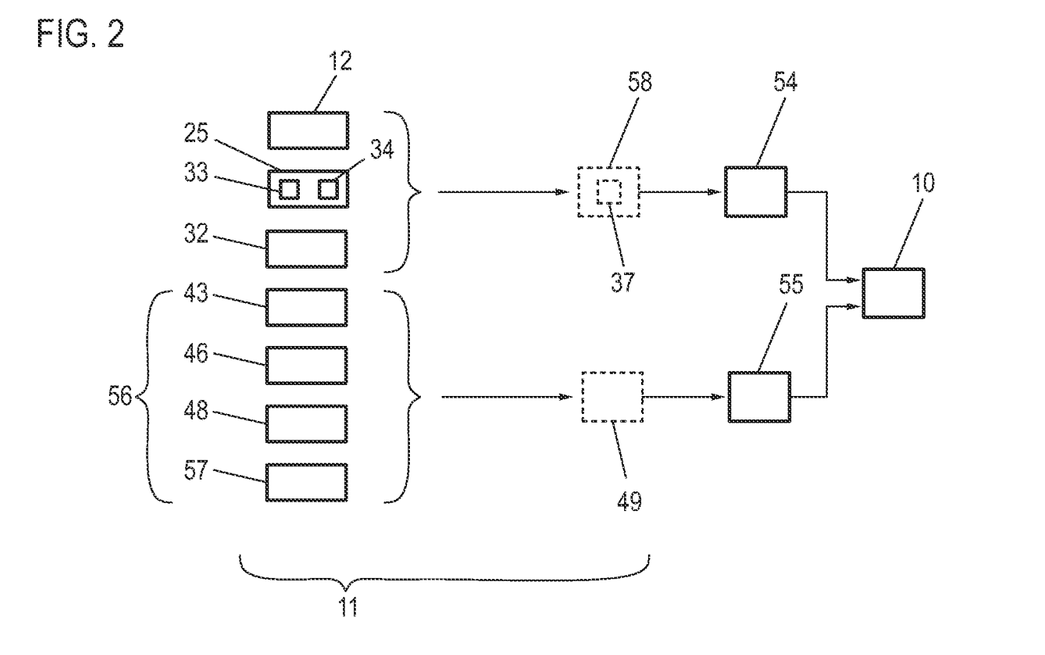
FIG. 2 shows relevant data structures which are used in operation of the motor vehicle shown in FIG. 1 or in carrying out an exemplary embodiment of the method according to the invention for determining the feedback torque.

It has been recognized that sharp transients or high-frequency changes of torque applications at the wheels 6, 7, which are to be fed back to the steering means 3, can be used in a timely manner for the torque feedback provision at the steering means 3 in particular by way of two approaches. On the one hand, the transmission path of corresponding forces or torques originating from the roadway 22 can be shortened, in that wheel sensor data 12 of a respective wheel sensor 13, 14 arranged in or at at least one of the wheels 6, 7 are analyzed as feedback data 11. In contrast to steering angle sensors, which form a part of the steering mechanism, force or torque applications can thus be detected directly at the respective wheel 6, 7 due to which damping or blurring of transients or a delay of the detection due to the inertia of the steering system can be avoided. As will be explained later with reference to FIG. 3, in particular deformations or force effects on the tire 17 of the respective wheel 6, 7 can be detected and evaluated directly, by which damping of the force or torque applications by the inertia of further components of the respective wheel 6, 7, thus in particular the rim 16 or the parts of the tire 17 facing away from the roadway, can be substantially avoided.

Alternatively or, as in the example, additionally roadway sensor data 25 from roadway sensors 26, 27 can be used as part of the feedback data 11 or as the basis of processing data 58, which are part of the feedback data 11. The roadway sensors 26, 27 are used for the contactless detection of a respective section 28, 29 of the roadway 22 in front of the motor vehicle 1. In the example, time-of-flight cameras are used as roadway sensors 26, 27, which provide image data 33 having the items of depth information 34 assigned to the individual pixels. Alternatively, for example, typical cameras, radar sensors, laser scanners, or the like could be used. Depending on the imaging range of the roadway sensors 26, 27, it can also be sufficient to use only one roadway sensor 26, 27 or more than two roadway sensors can also be used.

The processing of image data 33 or the contactlessly detected roadway sensor data 25 in general can result in a certain delay between the data detection and the provision of a feedback torque 10 resulting therefrom. However, since relevant roadway features 36, for example irregularities or objects, for example rocks, lying on the roadway 22 are already detected as part of the roadway sensor data 25 due to the contactless detection of the vehicle surroundings, before a wheel 6, 7 comes into contact with these roadway features 36, this delay can be compensated for, so that a feedback torque due to a roadway feature 36 can be played out precisely at the point in time at which this feature is expected to contact one of the wheels 6, 7. Roadway features 36, which are recognized on the basis of the roadway sensor data 25 can thus as a result be communicated without delay to the driver 4 when they contact one of the wheels 6, 7, in that corresponding feedback torques 10 are transmitted by the feedback actuator 8 to the steering means 3.

In principle, the roadway sensor data 25 could be provided directly as feedback data 11 at the control unit 9 and processed therein. However, the use of special circuits, for example a graphic processor, can be advantageous for processing image data, so that in the example at least the roadway sensor data 25, but preferably also the wheel sensor data 12, the steering angle data 43, and further input data also discussed later are preprocessed by a processing unit 35 and processing data 58 resulting therefrom or further processing data 49 are provided at the control unit.

The preprocessing can be used in particular, by evaluating the image data 33 and/or the depth information 34, to recognize roadway features 36, in particular irregularities, of the roadway 22 and determine their position 37 with respect to at least one of the wheels 6, 7. Approaches for recognizing specific features in the image data are known in the prior art and are therefore not to be explained in detail. For example, a scale-invariant feature transformation, a gradient-based approach for feature recognition, or also a suitably trained algorithm of machine learning, for example a trained neural network, can be used for recognizing and locating the roadway features 36.

The relative arrangement of the roadway sensors 26, 27 and the wheels 6, 7 in relation to one another is known or can be defined by calibration, for example in the context of the final acceptance of the motor vehicle 1 or a maintenance. If image data 33 with assigned depth information 34 are used, the position 37 of the recognize roadway feature 36 with respect to the respective wheel 6, 7 can thus be determined directly if depth information 34 is not known, the location of the plane of the roadway 22 with respect to the motor vehicle 1 can additionally be used by typical approaches in order to determine on the basis of the solid angle, within which the corresponding roadway feature 36 was recognized, its position with respect to the motor vehicle 1 and thus with respect to the wheels 6, 7.

Smaller irregularities of the roadway 22, for example, as occur on rough asphalt or gravel, would also be transmitted to the steering means 3 in the case of a mechanical or hydraulic coupling between is during means 3 and wheel 6, 7, by which additional items of information about the underlying surface quality would be provided to the driver 4. Corresponding vibrations can be relatively high-frequency and are therefore essentially not transmitted to the steering means 3 in typical steer-by-wire systems or electromechanical steering systems, which only evaluate the steering angle data 43, for example.

A detection of smaller irregularities via wheel sensors 13, 14 or roadway sensors 26, 27 would be relatively complex and not necessarily robustly possible in all driving situations. Therefore, microphones 30, 31 are additionally used in the motor vehicle 1, which are suitably arranged and configured to detect the running noises of the wheels 6, 7. For example, the microphones 30, 31 can be arranged in the area of the underbody and relatively close to the wheels 6, 7. An audio signal 32 is detected by the microphones 30, 31, the frequency composition of which is influenced by the irregularities of the roadway 22 and their interaction with the respective wheel 6, 7.

In the simplest case, the audio signal 32 can be used to apply a corresponding frequency spectrum to an additional noise component of the feedback torque 10. Alternatively, for example, it would also be possible to classify the underlying surface traveled on the basis of the audio signal, for example with the aid of a method of machine learning, and to take this classification into consideration in the context of the determination of the feedback torque 10 or the like.

As was already explained above in detail, the wheel sensor data 12, the roadway sensor data 25, and the audio signals 32 are well suitable to convert rapid, high-frequency and/or sudden torque or force applications at the wheels 6, 7 into a suitable feedback torque 10. To provide low-frequency or slowly varying components of the feedback torque 10, in contrast, it can be advantageous to additionally use the above-explained steering angle data 43 and/or further items of auxiliary information 56.

Since the evaluation of the items of auxiliary information 56 is only supposed to result in low-frequency changes of the feedback torque 10, it can be advantageous to use separate processing or feedback paths for processing the items of auxiliary information 56, on the one hand, and for processing the wheel sensor data 12, the roadway sensor data 25, and the audio signal 32, on the other hand, as schematically shown in FIG. 2. In this case, a preprocessing of the input data to form respective processing data 49, 58, for example by the processing unit 35, can optionally take place in the respective processing path, after which a partial torque 54, 55 is provided by the control unit 9 or a respective control subunit for each of the two feedback paths. The partial torque 54, 55 can be added to form the feedback torque 10. Optionally, however, a filtering of the respective partial torque 54, 55 can take place before the addition, wherein in particular high-pass filtering of the partial torque 54 and/or low-pass filtering of the partial torque 55 can take place.

In addition to the steering angle data 43, the following variables are used in the example as the items of auxiliary information 56: A parameter 46 of the suspension, in the example of the height level, is determined by a respective suspension sensor 44, 45. Moreover, the acceleration 48 of the motor vehicle is detected via the acceleration sensor 47. Additionally, at least one item of assistance information 57 is taken into consideration, which is provided by at least one driver assistance system 50 of the motor vehicle. In the example, the driver assistance system 50 is an electronic stability control, which comprises speed sensors as the components 52, 53 and a processing unit for determining a slip on the basis of the wheel speeds detected by the speed sensors as the component 51.

The assistance information 57 can be provided directly by the components 52, 53, thus by the sensors, however, already processed data are preferably provided by the processing unit implementing the driver assistance system 50. The relevance of the various items of auxiliary information 56 used was already explained in detail in the general part and is not to be repeated here.

As was already explained with reference to FIG. 1, the wheel speed sensors 13, 14 are in particular to enable the most direct possible detection of forces or torques acting on the respective wheel 6, 7. A particularly advantageous embodiment in this regard will be explained in more detail hereinafter on the basis of the example of the wheel 6 or the wheel sensor 13 with reference to FIG. 3.

Figure 3:
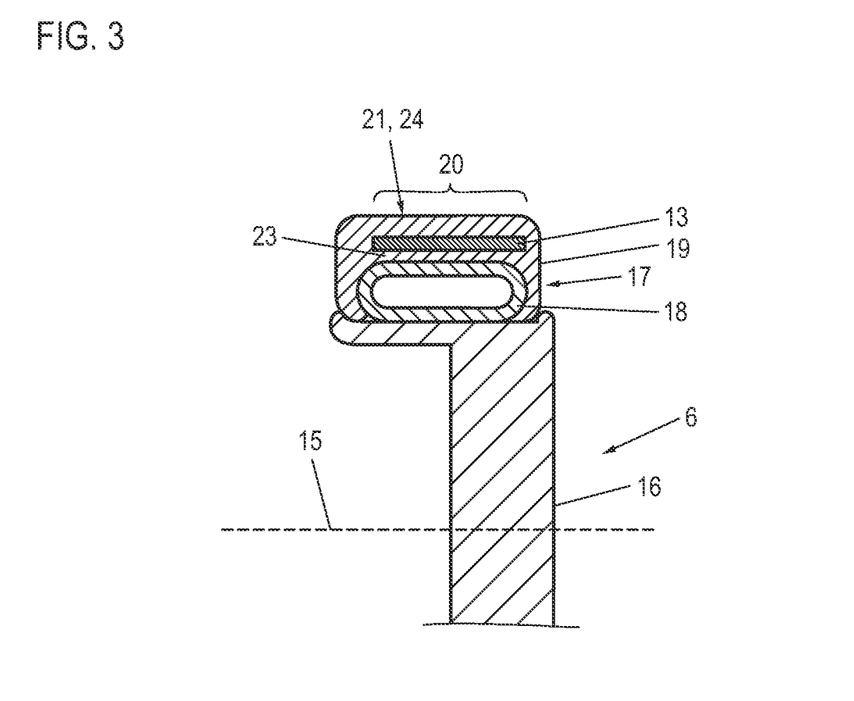
FIG. 3 shows a detail view of the wheel of the motor vehicle shown in FIG. 1 including the wheel sensor arranged there.

The wheel 6 is formed in the example shown by a rim 16 and a tire 17 surrounding the rim 16. In the example, the tire 17 comprises a casing 19 and a tube 18 supporting the casing 19 against the rim 16. The wheel sensor 13 is a piezoelectric sensor, which is embedded in a radial outer wall 23 of the tire 17 used for contacting the roadway 22. Alternatively, for example, the wheel sensor 13 could be arranged on the inner surface of the outer wall 23, wherein in this case an additional cover is preferably used to prevent damage to the wheel sensor 13 due to friction between tube 18 and casing 19.

A force acting on the outer wall 23 or its outer surface 24, which forms the tread 21 of the tire 17, results in a compression of the wheel sensor 13 in the vertical direction in FIG. 3 and thus a voltage drop at the piezoelectric sensor. A deformation of the outer wall 23 moreover results in a shear of the piezoelectric sensor and thus likewise in a voltage drop.

A force or torque application to the wheel 6 on the part of the roadway 22, since this is necessarily coupled in via the tire 17 of a wheel 6, can therefore be detected without damping by other sluggish components, for example the rim 16 or a steering mechanism, by which the delays or the damping of high frequencies and sharp transients explained at the outset can be avoided. The detection of a deformation of the section 20 of the tread 21 of the tire 17 or a force acting there is therefore well suitable to provide a feedback torque 10.

In the simplest case, the wheel sensor 13 in FIG. 3 can extend essentially completely around the axis of rotation 15 of the wheel 6 in the circumferential direction and, as shown, can extend essentially over the entire width of the tire 17. However, for example, to be able to distinguish whether the wheel 6 or the tire 17 contacts an irregularity 36 at its front or rear end or at its inside or outside, it can be advantageous to segment the wheel sensors 16 or the piezoelectric sensor elements in the circumferential direction of the wheel 6 or in the axial direction of the axis of rotation 15.

The invention claimed is:

1. A motor vehicle, comprising:
a steering wheel rotatably mounted around a steering axis, wherein a steering angle of at least one wheel of the motor vehicle is changeable;
a feedback actuator, wherein a feedback torque with respect to the steering axis is configured to be applied to the steering wheel by the feedback actuator; and
a control unit configured to specify the feedback torque as a function of feedback data provided to the control unit, wherein the feedback data are wheel sensor data of at least one wheel sensor of the motor vehicle respectively arranged in at least one roadway sensor of the motor vehicle, and the at least one roadway sensor is configured to contactlessly detect a section of a roadway traveled by the motor vehicle and preprocess data ascertained as a function of the wheel sensor data and roadway sensor data to derive the feedback torque.

2. The motor vehicle as claimed in claim 1, wherein the at least one wheel sensor is further configured to detect a deformation of at least one section of a tire surrounding a rim of the respective wheel and a force which acts on a tread of the tire used for contacting the roadway.

3. The motor vehicle as claimed in claim 2, wherein the at least one wheel sensor is a piezoelectric sensor, which is embedded in a radial outer wall configured to contact the roadway.

4. The motor vehicle as claimed in claim 2, further comprising:
a microphone configured to detect, a running noise of at least one of the wheels, wherein the feedback data additionally comprise an audio signal detected by the microphone.

5. The motor vehicle as claimed in claim 2, wherein the at least one roadway sensor is an imaging sensor configured to provide imaging data depicting the section of the roadway and provide at least one item of depth information with respect to the depicted section of the roadway.

6. The motor vehicle as claimed in claim 2, further comprising:
a steering angle sensor configured to detect steering angle data relating to the steering angle of at least one wheel;
a suspension sensor configured to detect a height level of a suspension; and
an acceleration sensor configured to detect an acceleration of the motor vehicle, wherein the feedback data comprise the steering angle data, the height level of the suspension, and the acceleration of the motor vehicle.

7. The motor vehicle as claimed in claim 1, wherein the at least one wheel sensor is a piezoelectric sensor, which is embedded in a radial outer wall configured to contact the roadway.

8. The motor vehicle as claimed in claim 7, further comprising:
a microphone configured to detect a running noise of at least one of the wheels, wherein the feedback data additionally comprise an audio signal detected by the microphone.

9. The motor vehicle as claimed in claim 7, wherein the at least one roadway sensor is an imaging sensor configured to provide imaging data depicting the section of the roadway and provide at least one item of depth information with respect to the depicted section of the roadway.

10. The motor vehicle as claimed in claim 7, further comprising:
a steering angle sensor configured to detect steering angle data relating to the steering angle of at least wheel;
a suspension sensor configured to detect for detecting a height level of a suspension; and
an acceleration sensor configured to detect for detecting an acceleration of the motor vehicle, wherein the feedback data comprise the steering angle data, the height level of the suspension, and the acceleration of the motor vehicle.

11. The motor vehicle as claimed in claim 1, further comprising:
a microphone configured to detect a running noise of at least one of the wheels, wherein the feedback data additionally comprise an audio signal detected by the microphone.

12. The motor vehicle as claimed in claim 11, wherein the at least one roadway sensor is an imaging sensor configured to provide imaging data depicting the section of the roadway and provide at least one item of depth information with respect to the depicted section of the roadway.

13. The motor vehicle as claimed in claim 1, wherein the at least one roadway sensor is an imaging sensor configured to provide imaging data depicting the section of the roadway and provide at least one item of depth information with respect to the depicted section of the roadway.

14. The motor vehicle as claimed in claim 13, wherein the control unit is further configured to recognize an irregularity, of the roadway and to determine a position of the irregularity with respect to at least one wheel, wherein a time curve of the feedback torque is dependent on the determined position of the irregularity.

15. The motor vehicle as claimed in claim 14, wherein the roadway sensor is a time-of-flight camera.

16. The motor vehicle as claimed in claim 13, wherein the at least one roadway sensor is a time-of-flight camera.

17. The motor vehicle as claimed in claim 1, further comprising:
a steering angle sensor configured to detect steering angle data relating to a steering angle of at least one wheel;
a suspension sensor configured to detect a height level of a suspension,
an acceleration sensor configured to detect an acceleration of the motor vehicle, wherein the feedback data comprise the steering angle data, the height level of the suspension, and the acceleration of the motor vehicle.

18. The motor vehicle as claimed in claim 1, further comprising:
an electronic stability control, wherein the feedback data comprise a sideslip angle of the motor vehicle.

19. The motor vehicle as claimed in claim 1, wherein the control unit is further configured to:
determine a first partial torque as a function of the wheel sensor data and the roadway sensor data,
determine a second partial torque as a function of an item of additional information provided by a further vehicle component, and
specify the feedback torque as a sum of the first partial torque and the second partial torque.

20. A method for providing a feedback torque for a steering wheel of a motor vehicle rotatably mounted around a steering axis, the method comprising:
changing a steering angle of at least one wheel of the motor vehicle by actuation of the steering wheel by a driver of the motor vehicle;
applying a feedback torque with respect to the steering axis to the steering wheel by a feedback actuator of the motor vehicle;
specifying the feedback torque as a function of feedback data, wherein the feedback data comprise wheel sensor data of at least one wheel sensor of the motor vehicle and roadway sensor data of at least one roadway sensor configured to contactlessly detect a section of a roadway traveled by the motor vehicle, and preprocess data ascertained as a function of the wheel sensor data and the roadway sensor data to derive the feedback torque.

* * * * *